(12) United States Patent
Baek (10) Patent No.: US 11,237,663 B2
(45) Date of Patent: Feb. 1, 2022

(54) TOUCH PANEL FOR A DISPLAY DEVICE

(71) Applicant: SAMSUNG DISPLAY CO., LTD., Yongin-si (KR)

(72) Inventor: Seungho Baek, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/358,287

(22) Filed: Mar. 19, 2019

(65) Prior Publication Data

US 2019/0310733 A1 Oct. 10, 2019

(30) Foreign Application Priority Data

Apr. 5, 2018 (KR) .................. 10-2018-0039498

(51) Int. Cl.
  *G06F 3/041* (2006.01)
  *G06F 3/044* (2006.01)
(52) U.S. Cl.
  CPC ............ *G06F 3/0416* (2013.01); *G06F 3/044* (2013.01)
(58) Field of Classification Search
  CPC .... G06F 3/0416; G06F 3/044; G06F 3/04164; G06F 3/04166; G06F 3/0412; G06F 3/0444
  See application file for complete search history.

(56) References Cited

U.S. PATENT DOCUMENTS

| | | | |
|---|---|---|---|
| 8,648,833 B2 * | 2/2014 | Lee | G06F 3/04166 345/174 |
| 9,626,030 B2 | 4/2017 | Lee et al. | |
| 9,696,845 B2 * | 7/2017 | Kim | G06F 3/016 |
| 9,779,678 B2 | 10/2017 | Mizuhashi et al. | |
| 9,910,549 B2 * | 3/2018 | Lee | G06F 3/044 |
| 10,108,283 B2 * | 10/2018 | Kim | G06F 3/0448 |
| 10,222,885 B2 * | 3/2019 | Lee | G06F 3/0446 |
| 10,908,719 B2 * | 2/2021 | Jun | G06F 3/04166 |
| 2008/0186417 A1 * | 8/2008 | Jung | G02F 1/13338 349/12 |
| 2012/0169400 A1 * | 7/2012 | Liu | G06F 3/04166 327/517 |
| 2013/0147724 A1 * | 6/2013 | Hwang | G06F 3/0412 345/173 |
| 2014/0028616 A1 * | 1/2014 | Furutani | G02F 1/136286 345/174 |
| 2014/0192019 A1 * | 7/2014 | Fukushima | G06F 3/0446 345/174 |
| 2014/0210743 A1 * | 7/2014 | Kurasawa | G06F 3/0446 345/173 |

(Continued)

FOREIGN PATENT DOCUMENTS

| KR | 10-1330320 | 11/2013 |
|---|---|---|
| KR | 10-2014-0026934 | 3/2014 |
| KR | 10-1783485 | 9/2017 |

*Primary Examiner* — Amy Onyekaba (74) *Attorney, Agent, or Firm* — F. Chau & Associates, LLC (57) ABSTRACT

A touch panel includes a first touch electrode and a second touch electrode disposed on a substrate; a common electrode that receives a common voltage that is a reference for a voltage transmitted to the first and second touch electrodes; a first touch wiring and a second touch wiring respectively connected to the first touch electrode and the second touch electrode; and a touch driver that transmits a driving signal to the first and second touch wirings.

24 Claims, 10 Drawing Sheets

(56) References Cited

U.S. PATENT DOCUMENTS

| | | | |
|---|---|---|---|
| 2014/0253498 A1* | 9/2014 | Suzuki | G06F 3/04166 345/174 |
| 2014/0292700 A1* | 10/2014 | Mizuhashi | G06F 3/0412 345/173 |
| 2015/0062062 A1* | 3/2015 | Han | G06F 3/0446 345/174 |
| 2015/0077387 A1* | 3/2015 | Han | G06F 3/0443 345/174 |
| 2015/0116263 A1* | 4/2015 | Kim | G06F 3/0443 345/174 |
| 2015/0220204 A1* | 8/2015 | Noguchi | G06F 3/044 345/174 |
| 2015/0241750 A1* | 8/2015 | Kim | G02F 1/136286 349/47 |
| 2015/0309661 A1* | 10/2015 | Kim | G06F 3/0443 345/174 |
| 2015/0378486 A1* | 12/2015 | Yu | G06F 3/0446 345/174 |
| 2016/0098126 A1* | 4/2016 | Lee | G06F 3/04166 345/174 |
| 2016/0147339 A1* | 5/2016 | Teranishi | G06F 3/04184 345/174 |
| 2016/0178974 A1* | 6/2016 | Li | G02F 1/13458 345/174 |
| 2016/0188142 A1* | 6/2016 | Oh | G06F 3/044 345/174 |
| 2016/0246432 A1* | 8/2016 | Hong | G06F 1/1652 |
| 2016/0299619 A1* | 10/2016 | Cheng | G06F 3/04164 |
| 2016/0320886 A1* | 11/2016 | Kim | G06F 3/0446 |
| 2017/0003797 A1* | 1/2017 | Yang | G06F 3/04166 |
| 2017/0010714 A1* | 1/2017 | Lee | G06F 3/0448 |
| 2017/0038885 A1* | 2/2017 | Liu | G09G 3/003 |
| 2017/0090630 A1* | 3/2017 | Kim | G06F 3/047 |
| 2017/0108970 A1* | 4/2017 | Kim | G09G 3/2092 |
| 2017/0160863 A1* | 6/2017 | Suzuki | G02F 1/13338 |
| 2017/0168620 A1* | 6/2017 | Gim | G06F 3/0412 |
| 2017/0168642 A1* | 6/2017 | Lee | G02F 1/134309 |
| 2017/0177134 A1* | 6/2017 | Kurasawa | G06F 3/0445 |
| 2017/0242529 A1* | 8/2017 | Park | G06F 3/0443 |
| 2017/0262121 A1* | 9/2017 | Kurasawa | G06F 3/0443 |
| 2017/0337892 A1* | 11/2017 | Kim | G02F 1/134336 |
| 2017/0351369 A1* | 12/2017 | Kim | G06F 3/0443 |
| 2017/0357345 A1* | 12/2017 | Ikeda | H01L 27/3246 |
| 2017/0357353 A1* | 12/2017 | Katsuta | G06F 3/04164 |
| 2018/0024677 A1* | 1/2018 | Kim | G06F 3/0446 345/173 |
| 2018/0024678 A1* | 1/2018 | Nitobe | G09G 3/3677 345/174 |
| 2018/0059832 A1* | 3/2018 | Cho | G09G 3/3648 |
| 2018/0074631 A1* | 3/2018 | Hashida | B32B 15/04 |
| 2018/0081466 A1* | 3/2018 | Moon | G06F 3/04166 |
| 2019/0073080 A1* | 3/2019 | Choi | G06F 3/04164 |
| 2019/0095001 A1* | 3/2019 | Xie | G06F 3/0443 |
| 2019/0114007 A1* | 4/2019 | Mugiraneza | G06F 3/0446 |
| 2019/0179475 A1* | 6/2019 | Seo | G06F 3/0383 |
| 2019/0204944 A1* | 7/2019 | Jun | G06F 3/04166 |
| 2020/0249787 A1* | 8/2020 | Koide | G02F 1/136286 |

* cited by examiner

TOUCH PANEL FOR A DISPLAY DEVICE

CROSS-REFERENCE TO RELATED APPLICATION

This application claims priority under 35 U.S.C. § 119 from, and the benefit of, Korean Patent Application No. 10-2018-0039498, filed on Apr. 5, 2018 in the Korea Intellectual Property Office (KIPO), the contents of which are herein incorporated by reference in their entirety.

1. Technical Field

Embodiments of the present disclosure are directed to a display device, and more particularly, to a display device that can reduce the number of touch wirings by reversing voltages of touch electrodes with respect to a common voltage of a common electrode.

2. Discussion of the Related Art

Display devices can be classified as liquid crystal display ("LCD") devices, OLED display devices, plasma display panel ("PDP") display devices, or electrophoretic display devices based on a light emitting scheme thereof. Such display devices may include a touch layer. In the case of a self-cap type touch layer, the number of wirings is large and the number of multiplexers ("MUXes") is large because each wiring connected to a touch electrode should receive the voltage output from a MUX.

SUMMARY

Embodiments of the present disclosure can provide a display device that can reduce the number of touch wirings, by omitting the touch wiring and applying voltages, each having the same magnitude difference, in an opposite direction with respect to a common voltage applied to the common electrode.

According to an embodiment, a touch panel includes: a first touch electrode and a second touch electrode disposed on a substrate; a common electrode that receives a common voltage that is a reference of a voltage transmitted to the first and second touch electrodes a first touch wiring and a second touch wiring respectively connected to the first touch electrode and the second touch electrode; and a touch driver that transmits a driving signal to the first and second touch wirings.

The common voltage may be a direct, current ("DC") voltage.

The touch panel may further include a MUX of which one terminal is connected to the first touch wiring and, the second touch wiring.

The first touch electrode and the second touch electrode may be vertically adjacent to each other in one column.

The first touch electrode and the second touch electrode may be horizontally adjacent to each other in one row.

The first touch electrode and the second touch electrode may be arranged in odd-numbered rows of one column.

The first touch electrode and the second touch electrode may be arranged in even-numbered rows of one column.

The touch driver may transmit a first voltage to the first touch electrode through the MUX, and transmit a second voltage to the second touch electrode through the MUX. The first voltage and the second voltage may each have the same magnitude difference in the opposite direction with respect to the common voltage.

The touch panel may further include a switch unit connected to the first touch electrode and the second touch electrode that transmits the first voltage to the first touch electrode and that transmits the second voltage to the second touch electrode.

According to another embodiment, a touch panel includes: a first touch electrode, and a second touch electrode disposed on a substrate; a first touch wiring and a second touch wiring respectively connected to the first touch electrode and the second touch electrode; a MUX of which one terminal is connected to the first touch wiring and the second touch wiring; and a touch driver that transmits a driving signal to the touch wirings.

The touch panel may further include a common electrode that receives a common voltage that is a reference of a voltage transmitted to the first and second touch electrodes.

The common voltage may be a DC voltage.

The first touch electrode and the second touch electrode may be vertically adjacent to each other in one column.

The first touch electrode and the second touch electrode may be horizontally adjacent to each other in one row.

The first touch electrode and the second touch electrode may be arranged in odd-numbered rows of one column.

The first touch electrode and the second touch electrode may be arranged in even-numbered rows of one column.

The touch driver may transmit a first voltage to the first touch electrode through the MUX, and transmit a second voltage to the second touch electrode through the MUX. The first voltage and the second voltage may each have the same magnitude difference in the opposite direction with respect to the common voltage.

The display device may further include a switch unit connected to the first touch electrode and the second touch electrode that transmits the first voltage to the first touch electrode and that transmits the second voltage to the second touch electrode.

According to another embodiment, a touch panel includes: a first touch electrode and a second touch electrode disposed on a substrate; a first touch wiring and a second touch wiring respectively connected to the first touch electrode and the second touch electrode; a touch driver that transmits a first voltage and a second voltage to the first and second touch wirings, respectively; and a switch unit connected to the first touch electrode, and the second touch electrode that transmits the first voltage to the first touch electrode and that transmits the second voltage to the second touch electrode.

The touch panel may further include a MUX of which one terminal is connected to the first touch wiring and the second touch wiring, wherein the touch driver transmits the first voltage to the first touch electrode through the MUX, and transmits the second voltage to the second touch electrode through the MUX.

The touch panel may further include a common electrode that receives a connected to the voltage that is a reference of the first and second voltages respectively transmitted to the first and second touch electrodes, wherein the common voltage is a DC voltage.

The first voltage and the second voltage may each have the same magnitude difference in opposite directions with respect to the common voltage.

DETAILED DESCRIPTION

Exemplary embodiments will now be described more fully hereinafter with reference to the accompanying drawings. Although the disclosure may be modified in various manners and have several embodiments, embodiments are illustrated in the accompanying drawings and will be mainly described in the specification. However, the scope of the disclosure is not limited to the embodiments and should be construed as including all the changes, equivalents and substitutions included in the spirit and scope of the disclosure.

In the drawings, thicknesses of a plurality of layers and areas may be exaggerated for clarity and ease of description thereof. When a layer, area, or plate is referred to as being "on" another layer, area, or plate, it may be directly on the other layer, area, or plate, or intervening layers, areas, or plates may be present therebetween.

Throughout the specification, when an element is referred to as being "connected" to another element, the element is "directly connected" to the other element, or "electrically connected" to the other element with one or more intervening elements interposed therebetween.

"About" or "approximately" as used herein is inclusive of the stated value and means within an acceptable range of variation for the particular value as determined by one of ordinary skill in the art, considering the measurement in question and the error associated with measurement of the particular quantity, i.e., the limitations of the measurement system.

Like reference numerals may refer to like elements throughout the specification.

Hereinafter, exemplary embodiments of the present disclosure will be described with reference to FIGS. 1 to 10.

Figure 1:
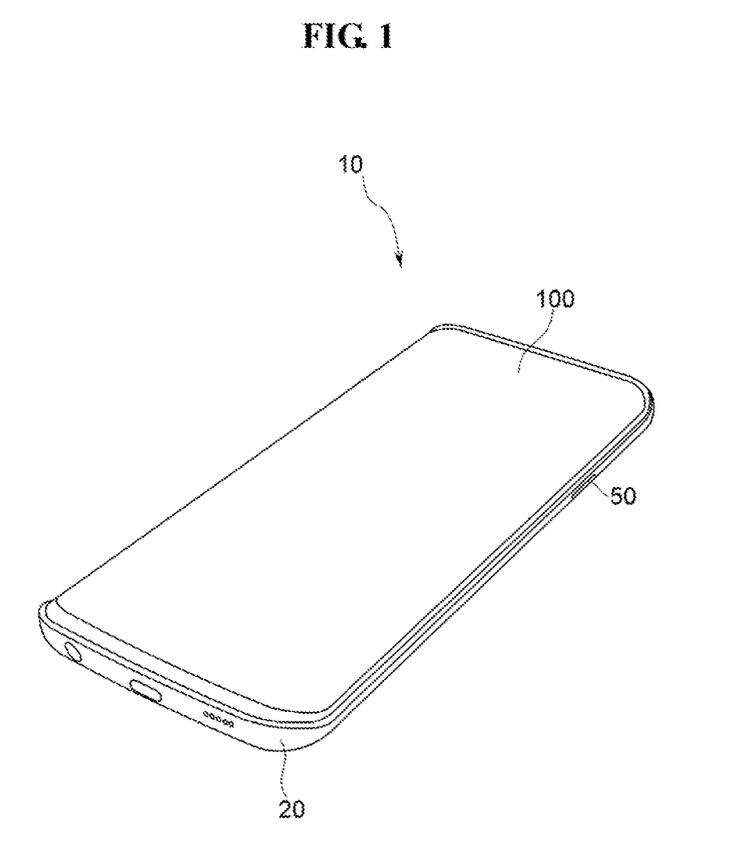
FIGS. 1 and 2 are respectively a perspective view and a block diagram of a display device according to an embodiment of the present disclosure.
Figure 2:
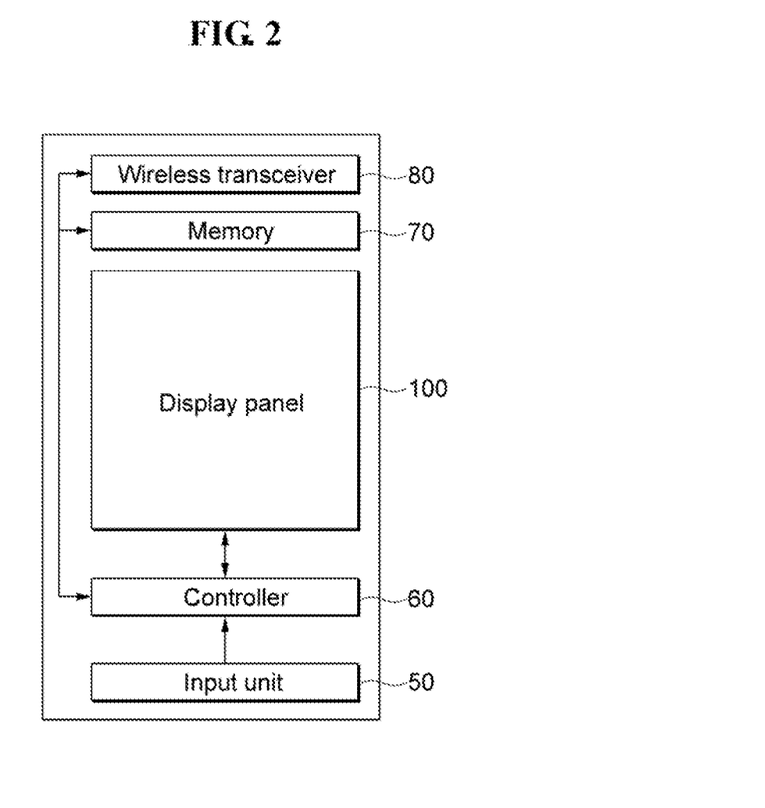

FIGS. 1 and 2 are respectively a perspective view and a block diagram of a display device according to an embodiment of the present disclosure.

Referring to FIGS. 1 and 2, according to an embodiment, a display device 10 includes a housing 20, such as a portable housing, and further includes a controller 60 and an input unit 50 secured in the housing 20. The display device 10 may be a mobile wireless communication device, such as a cellular telephone. The display device 10 may also be another type of electronic devices, such as a tablet computer, a laptop computer, a wearable computer, etc.

According to an embodiment, a wireless transceiver 80 is also secured in the housing 20 and is coupled to the controller 60. The wireless transceiver 80 performs at least one wireless communication function on, for example, voice and/or data, in cooperation with the controller 60. In some embodiments, the display device 10 does not include the wireless transceiver 80 or other wireless communication circuitry. The controller 60 includes an application processor ("AP") and a driving chip.

According to an embodiment, a display panel 100, which may be also referred to as a display layer or a display area, is secured in the housing 20 and is coupled to the controller 60. The display panel 100 may be, for example, a light emitting diode ("LED") display panel. In addition, the display panel 100 includes an additional circuitry to provide a touch display function.

According to an embodiment, a memory 70 is coupled to the controller 60. The memory 70 stores data.

According to an embodiment, the display panel 100 is a touch display, and the touch display serves as both an input device and a display. In addition, the display panel 100 performs one or more functions in response to the input in cooperation with the controller 60. For example, the display panel 100 turns power of the display device 10 on and off, initiates communication through the wireless transceiver 80, and/or performs a menu function based on an input to the touch display.

More specifically, according to an embodiment, with respect to the menu function, the controller 60 displays, a menu of available applications on the display panel 100 based on the input or touch on the touch display. In addition, the input unit 50, such as a push button switch, is secured in the housing 20.

Figure 3:
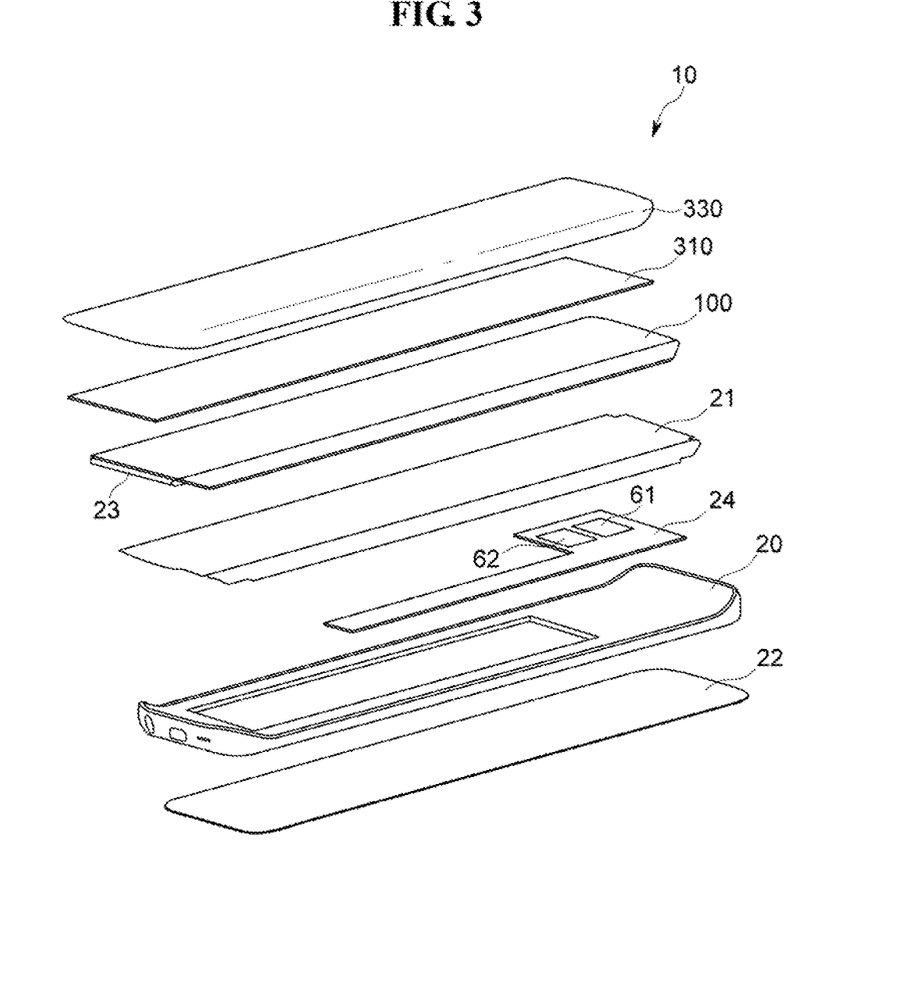
FIG. 3 is a schematic exploded perspective view of a display device of FIG. 1.

FIG. 3 is a schematic exploded perspective view of a display device of FIG. 1. Hereinafter, the display device 10 according to an embodiment of the present disclosure will be described in more detail with reference to FIG. 3.

Referring to FIG. 3, according; to an embodiment, the display device 10 includes a transparent cover layer 330, a touch unit 310, a display panel 100, a bracket 21, a printed circuit board 24, a housing 20, and a back cover 22. According to embodiments of the present disclosure, these elements may be stacked in close contact with each other or partially spaced apart from each other.

According to an embodiment, the transparent cover layer 330 provides the front appearance of the display device 10, and includes a transparent material, such as glass, so that images output through the display panel 100 are visible. A part of the circumference of the transparent cover layer 330 is curved in the direction toward a back surface thereof to form a curved surface. The accompanying drawings illustrate a state in which a side surface portion of the transparent cover layer 330 is curved.

According to an embodiment, the display panel 100 is disposed below the transparent cover layer 330, and displays images. The display panel 100 includes a substrate, a plurality of pixels PX disposed on one surface of the substrate, and at least one conductive line electrically connected to the pixels PX. The substrate includes a flexible material so that at least a part, such as a bent portion 23, can be bent toward a back surface thereof. The conductive line includes at least one gate line or at least one data line. According to an embodiment, a plurality of gate lines and a plurality of data lines are arranged in a matrix, and the plurality of pixels PX are arranged adjacent to the points where lines intersect each other and are electrically connected thereto.

According to various embodiments, the display panel 100 is connected to a display driving circuit. The display driving circuit is connected to the bent portion 23 of the display panel 100. The display driving circuit is electrically connected to the conductive line. The display driving circuit includes a driver IC 61 that provides a driving signal and an image signal to the display panel 100, or a timing controller (T-con) that controls the driving signal and the image signal. The driver IC 61 includes a gate driver IC that sequentially selects a gate signal line of the display panel 100 to transmit a scan signal or a driving signal thereto, and a data driver IC or a source driver IC that transmits an image signal to a data signal line of the display panel 100. When the gate driver IC selects a gate signal line and transmits a scan signal to change the corresponding pixel PX to the active state, the data driver IC transmits an image signal to the corresponding pixel PX through the data signal line. The timing controller substantially prevents a display time difference that can occur in the output process of the display panel 100 by controlling the transmission time of the signals transmitted to the driver IC.

According to an embodiment, the bracket 21 has the same or similar size as the transparent cover layer 330, and secures and supports the display panel 100. At least a part of the bracket 21 is covered by the bent portion 23 of the display panel 100. For example, a part of the display panel 100 other than the bent portion 23 is placed on the front surface of the bracket 21, and the bent portion 23 of the display panel 100 curves to cover one side surface and a part of a back surface of the bracket 21. At least a part of the bracket 21 in contact with the display panel 100 is coated with an adhesive material or includes an adhesive layer so that the display panel 100 may be fixed to the bracket 21.

According to an embodiment, the printed circuit board 24 is disposed below the bracket 21, and various electronic components are mounted on the printed circuit board 24. For example, at least one electronic element, such as a circuit line, etc., is disposed on the printed circuit board 24, and parts thereof are electrically connected to each other. The electronic components include, for example, the controller 60, the memory 70, the wireless transceiver 80, etc. The display driving circuit may be electrically connected to the printed circuit board 24 or disposed on the printed circuit board 24.

According to various embodiments, the printed circuit board 24 includes a plurality of printed circuit boards 24, and at least some of the plurality of printed circuit boards 24 are electrically connected to each other. In addition, the driver IC 61 and an application processor 62 are disposed on the printed circuit board 24.

According to an embodiment, the housing 20 secures and supports the internal components of the display device 10. The display, panel 100, the bracket 21, and the printed circuit board 24 are stacked in the order and seated in the housing 20.

According to various embodiments, at least one surface, of the housing 20 includes a metal. For example, a side surface of the housing 20 includes a metal frame. The transparent cover layer 330 is detachably attached to the housing 20. The transparent cover layer 330 is coupled to the side surface of the housing 20 and covers a front surface of the housing 20.

According to an embodiment, the back cover 22 provides the back appearance of the display device 10. The back cover 22 is detachably attached to the housing 20. The back cover 22 is coupled to a side surface of the housing 20 and, covers a back surface of the housing 20.

According to various embodiments, the display device 10 may exclude at least one of the above-described elements or may further include at least one other element. The display device 10 further includes a touch unit 310. The touch unit 310 is stacked between the transparent cover layer 330 and the display panel 100, and includes, a touch sensor that can detect a contact or an approach of a touch object, such as a user's body part or an electronic pen. The touch unit 310 is controlled by the driver IC 61. In addition, the display device 10 further includes a battery that supplies power to the display device 10.

Figure 4:
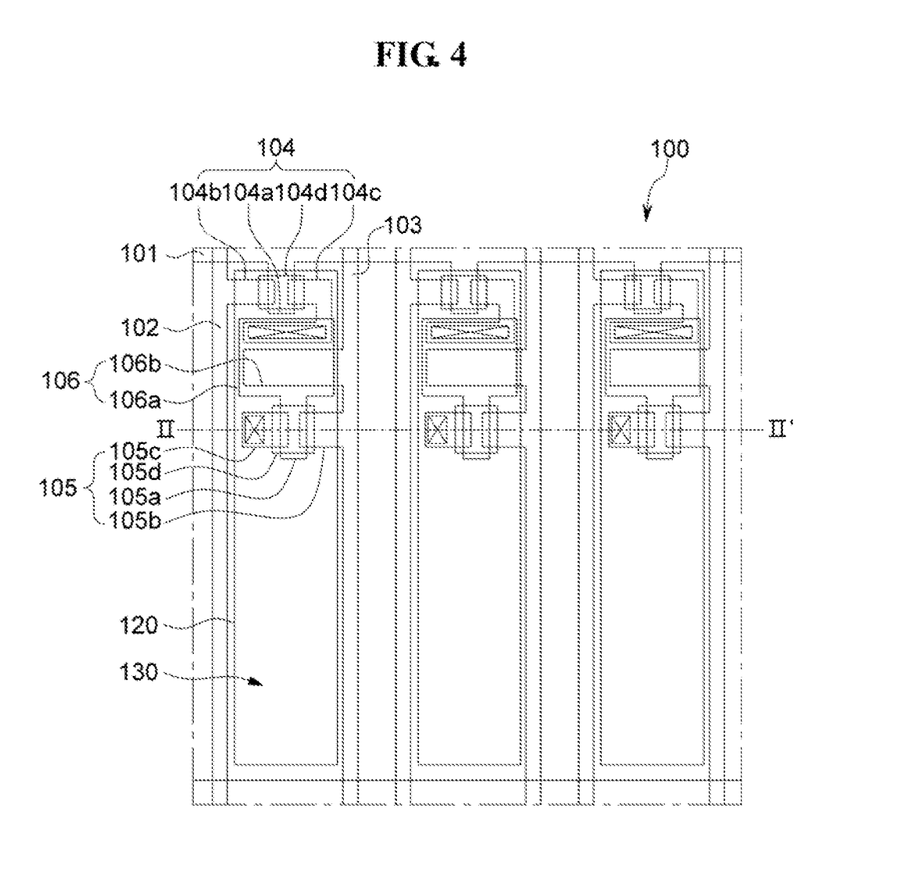
FIGS. 4 and 5 respectively are a plan view and a cross-sectional view of a general display device according to an embodiment of the present disclosure.
Figure 5:
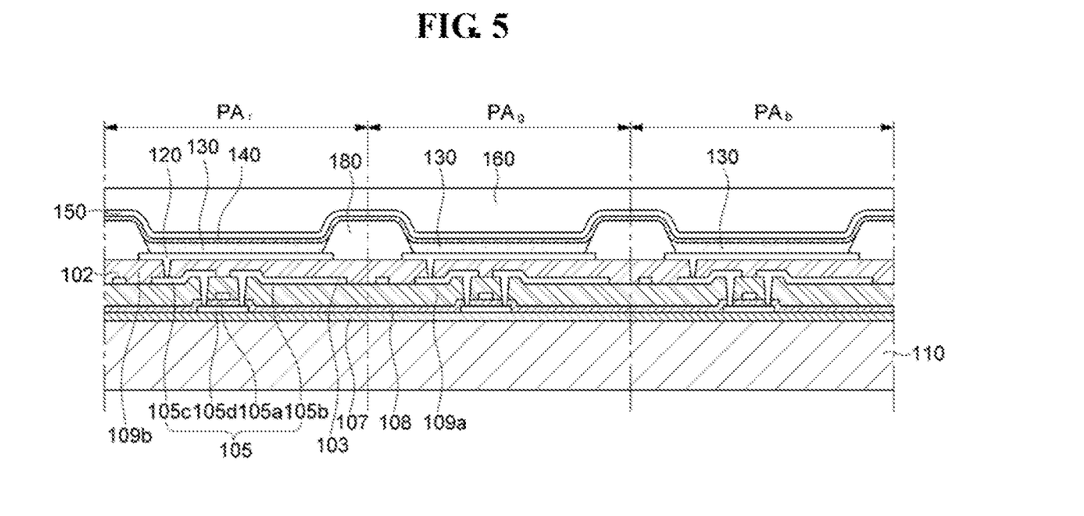

FIGS. 4 and 5 respectively are a plan view and a cross-sectional view of a general display device according to an embodiment of the present disclosure.

Referring to FIGS. 4 and 5, the display panel 100 according to an embodiment of the present disclosure includes a gate line 101 disposed along one direction, a data line 102 insulated from and intersecting the gate line 101, a common power line 103, a switching thin film transistor ("TFT") 104, a driving TFT 105, a capacitor 106 on a first substrate 110.

That is, one pixel of a display device according to an embodiment of the present disclosure has a 2TFT-1CAP structure which includes two TFTs and one capacitor 106. However, embodiments are not limited thereto, and one pixel may include three or more TFTs and two or more capacitors.

According to an embodiment, the switching TFT 104 selects a pixel from which light is to be emitted. The switching TFT 104 includes a switching gate electrode 104a connected to the gate line 101, a switching source electrode 104b connected to the data line 102, a switching drain electrode 104c connected to a first capacitor plate 106a, and a switching semiconductor layer 104d.

According to an embodiment, the driving TFT 105 transmits driving power, which enables an organic light emitting layer 130 in a pixel selected by the switching TFT 104 to emit light. The driving TFT 105 includes a driving gate electrode 105a connected to the first capacitor plate 106a, a driving source electrode 105b connected to the common power line 103, a driving drain electrode 105c connected to a first electrode 120, and a driving semiconductor layer 105d.

According to an embodiment, the capacitor 106 includes the first capacitor plate 106a and a second capacitor plate 106b. The first capacitor plate 106a is connected to the switching drain electrode 104c and the driving gate electrode 105a, and the second capacitor plate 106b is connected to the common power line 103. The capacitance of the capacitor 106 is determined by the charge stored in the capacitor 106 and the voltage between the first capacitor plate 106a and the second capacitor plate 106b.

According to an embodiment, a voltage difference between a common voltage transmitted to the driving TFT 105 from the common power line 103 and the data voltage transmitted from the switching TFT 104 is stored in the capacitor 106, and a current corresponding to the voltage stored in the capacitor 106 flows to the organic light emitting layer 130 through the driving TFT 105 such that the organic light emitting layer 130 can emit light.

According to an embodiment, the first substrate 110 is formed from an insulating substrate that includes a material that is one of glass, quartz, ceramic or plastic. However, embodiments are not limited thereto, and the first substrate 110 may include a metal, such as stainless steel.

According to an embodiment, the first substrate 110 includes red, green, and blue pixel areas $PA_r$, $PA_g$, and $PA_b$. The red, green and blue pixel areas $PA_r$, $PA_g$ and $PA_b$ are defined by a pixel defining layer 180 to be described below, and the red, green and blue pixel areas $PA_r$, $PA_g$ and $PA_b$ are sequentially disposed on the first substrate 110. In addition, the first substrate 110 may include a white pixel area.

According to an embodiment, a buffer layer 107 is disposed on the first substrate 110, and serves to substantially prevent infiltration of moisture or impurities through the first substrate 110 and to planarize the surface of the first substrate 110. The buffer layer 107 may include an inorganic insulating layer or an organic insulating layer, and can be deposited on the first substrate 110 by various deposition methods, such as a plasma enhanced chemical vapor deposition ("PECVD") method, an atmospheric pressure chemical vapor deposition ("APCVD") method, or a low pressure chemical vapor deposition ("LPCVD") method, by using, e.g., $SiO_2$, $SiN_x$, etc. However, embodiments are not limited thereto, and the buffer layer 107 may be removed if not needed.

According to an embodiment, the driving semiconductor layer 105d is disposed on the buffer layer 107, and the driving semiconductor layer 105d includes a source area, a drain area, and a channel area therebetween.

According to an embodiment, a gate insulating layer 108 is disposed on the buffer layer 107 that covers the driving semiconductor layer 105d, and the mite insulating layer 108 substantially prevents infiltration of moisture or impurities through the first substrate 110. The gate insulating layer 108 includes an insulating material and may be formed as a single layer or as multiple layers that include silicon nitride (SiNx) or silicon oxide (SiOx). However, embodiments are not limited thereto, and the gate insulating layer 108 may include various other insulating materials.

According to an embodiment, the driving gate electrode 105a is disposed on the gate insulating layer 108, and an insulating interlayer 109a is disposed on the gate insulating layer 108 that covers the driving gate electrode 105a.

According to an embodiment, the driving source and drain electrodes 105b and 105c are disposed on the insulating interlayer 109a and are spaced apart from each other, and the driving source and drain electrodes 105b and 105c respectively contact the source area and the drain area of the driving semiconductor layer 105d through openings in the gate insulating layer 108 and the insulating interlayer 109a.

According to an embodiment, a protective layer 109b is disposed on the insulating interlayer 109a that covers the driving source and drain electrodes 105b and 105c. The protective layer 109b protects the driving TFT 105, and may include an inorganic insulating layer or an organic insulating layer.

According to an embodiment, the first electrode 120, the organic light emitting layer 130, and a second electrode 140 are sequentially disposed on the protective layer 109b. The first electrode 120 may be an anode for injecting holes, and the second electrode 140 may be a cathode for injecting electrons. However, embodiments are not limited thereto, and the first electrode 120 may be a cathode and the second electrode 140 may be an anode.

According to an embodiment, the organic light emitting layer 130 may include a low molecular organic material or a high molecular organic material. The organic light emitting layer 130 includes red, green and blue organic light emitting layers, and the red, green and blue organic light emitting layers 130r, 130g and 130b are disposed in the red, green and blue pixel areas $PA_r$, $PA_g$ and $PA_b$, respectively. In some embodiments, there is a color filter. In addition, the organic light emitting layer 130 may include a single-color organic light emitting layer.

According to an embodiment, the display panel 100 according to an embodiment of the present disclosure has a top emission type structure, and thus the first electrode 120 is formed using a reflective layer, and the second electrode 140 is formed using a transflective layer.

According to an embodiment, the reflective layer and the transflective layer include one or more metals selected from titanium (Ti), magnesium (Mg), silver (Ag), gold (Au), calcium (Ca), lithium (Li), chromium (Cr), or aluminum (Al), or an alloy thereof. The reflective layer and the transflective layer can be distinguished from each other by their thicknesses. Typically, the transflective layer has a thickness of about 200 nm or less. In addition, the reflective layer and the transflective layer may have a multi-layer structure that includes a metal layer that includes a metal or an alloy of a metal, and a transparent conductive oxide ("TCO") layer stacked on the metal layer.

According to an embodiment, the first electrode 120 further includes a transparent conductive layer, and the transparent conductive layer includes a transparent conductive oxide ("TCO"), such as indium tin oxide (ITO), indium zinc oxide (IZO), zinc oxide (ZnO), or indium oxide ($In_2O_3$).

According to an embodiment, the first electrode 120 may have a structure that includes a reflective layer, a double-layer structure that includes a reflective layer and a transparent conductive layer, or a triple-layer structure in which a transparent conductive layer, a reflective layer, and, a transparent conductive layer are sequentially stacked. However, embodiments are not limited thereto, and the first electrode may have a structure that includes a transparent conductive layer.

According to an embodiment, the second electrode 140 has a structure that includes a transparent conductive layer. When the second electrode 140 includes a transparent conductive layer, the second electrode 140 is an anode that injects holes, and the first electrode 120 is formed using a reflective layer and becomes a cathode.

In an embodiment, the pixel defining layer 180 is disposed on the first electrode 120, and the pixel defining layer 180 covers an edge of the first electrode 120 and has a predetermined opening that exposes a center portion of the first electrode 120. That is, the first electrode 120, the organic light emitting layer 130, and the second electrode 140 are sequentially stacked in the opening of the pixel defining layer 180. The second electrode 140 is also formed on the pixel defining layer 180 as well.

According to an embodiment, a capping layer 150 is disposed on the second electrode 140. The capping layer 150 protects the first electrode 120, the organic light emitting layer 130, and the second electrode 140 and also allows the light emitted by the organic light emitting layer 130 to efficiently propagate outside.

According to an embodiment, a thin film encapsulation layer 160 is disposed on the capping layer 150. The thin film encapsulation layer 160 seals the first electrode 120, the organic light emitting layer 130, the second electrode 140, and the capping layer 150 and protects them from the infiltration of moisture, oxygen, etc.

According to an embodiment, the thin film encapsulation layer 160 has a structure in which at least one organic layer and at least one inorganic layer are alternatively disposed. However, embodiments are not limited thereto, and the thin film encapsulation layer 160 may have a single layer, e.g., an organic layer or an inorganic layer.

According to an embodiment; a red color filter, a green color filter, and a blue color filter are disposed on the thin film encapsulation layer 160 in the red pixel area $PA_r$, the green pixel area $PA_g$, and the blue pixel area $PA_b$, respectively.

In addition, according to an embodiment, as, described above, a protective film may be disposed below the first substrate 110. In addition, when color filters are provided, the touch unit 310 is disposed above the color filters.

In another embodiment, the touch unit 310 is disposed on the thin film encapsulation layer 160, and the color filter and a planarization layer is disposed on the touch unit 310.

Figure 6:
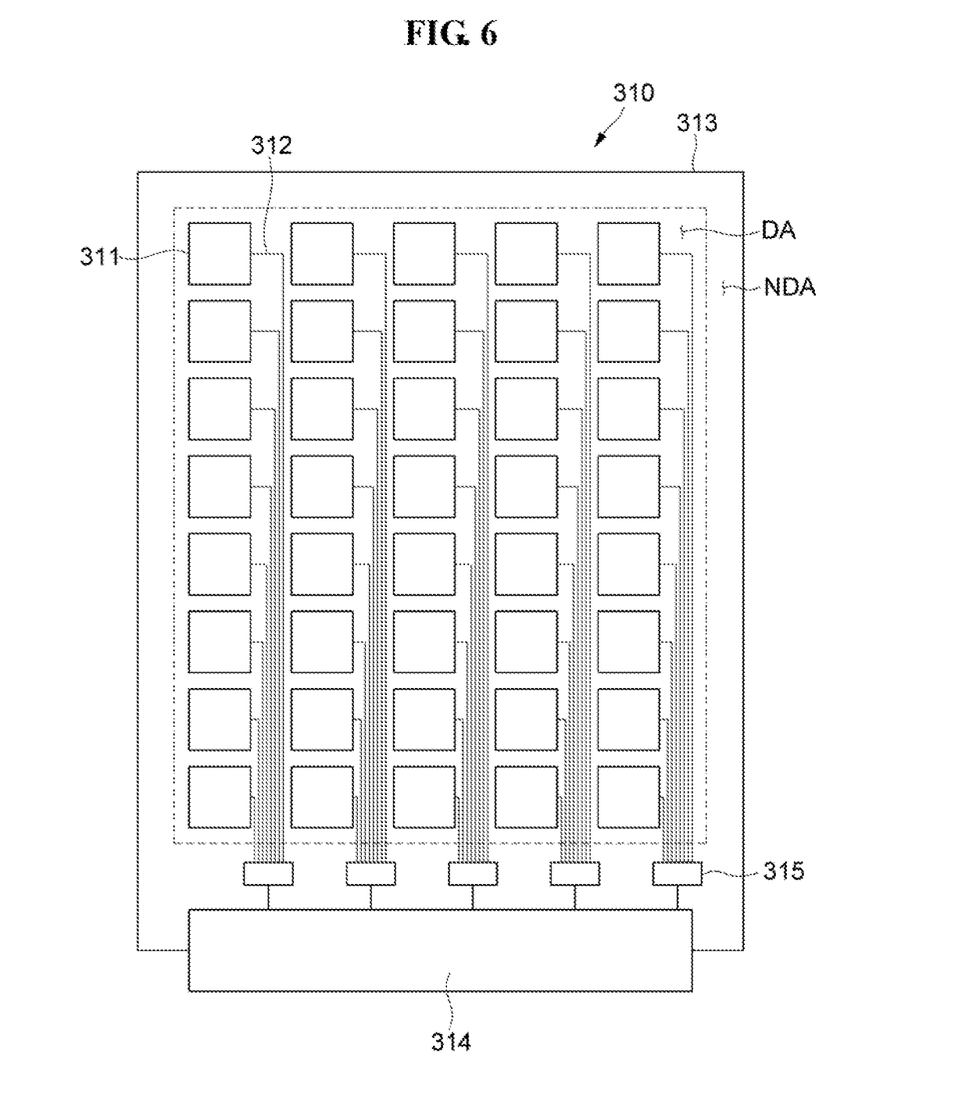
FIG. 6 is a plan view of a touch unit of a general display device according to an embodiment of the present disclosure.

FIG. 6 is a plan view of a touch unit of a general display device, according, to an embodiment of the present disclosure. Referring to FIG. 6, the touch unit 310 according to an embodiment of the present disclosure includes a substrate 313, a plurality of touch electrodes 311 arranged in a matrix on the substrate 313, and a plurality of touch wirings 312 and a plurality of multiplexors (MUXes) 315 disposed on the substrate 313 and connected to each of the touch electrodes 311, and a touch driver 314.

According to an embodiment, the substrate 313 includes a display area DA in which the plurality of touch electrodes 311 are arranged, and a non-display area NDA around the display area DA. The substrate 313 may include a transparent material such as glass or plastic.

According to an embodiment, the touch electrodes 311 and the touch wirings 312 are disposed on substantially a same layer on the substrate 313.

According to an embodiment, one end of each of the touch wirings 312 is connected to a corresponding touch electrode 311, and another end of each of the touch wirings 312 is connected to one of the MUXes 315.

According to an embodiment, each MUX 315 is connected to the touch driver 314. The touch driver 314 transmits various driving signals that drive the touch unit 310, and determines the presence of a touch input and touch coordinates by using a capacitance variation or a voltage variation measured by a touch electrode 311.

According to an embodiment, various signals received from the touch driver 314 are transmitted to, each of the touch electrodes 311 through the touch wiring 312, and a sensing signal detected by one of the touch electrodes 311 is transmitted to the touch driver 314 through the touch wiring 312.

According to an embodiment, the touch driver 314 may be disposed directly on the substrate 313 in the form of an integrated circuit ("IC"), or may be implemented as a separate configuration, such as, a printed circuit board or a flexible printed circuit board.

According to an embodiment, in the case of a self-cap type touch unit, the density of the touch electrodes decreases as, the number, of touch wirings increases and the number of MUXes increases.

According to an embodiment, the touch unit 310 is formed on a separate substrate and then disposed on the display panel 100. However, embodiments are not limited thereto, and the touch unit 310 may be formed in an on-cell manner in which it is disposed directly on the display panel 100 without a separate substrate, or in an in-cell manner in which it is disposed in the display panel 100 without a separate substrate.

Figure 7:
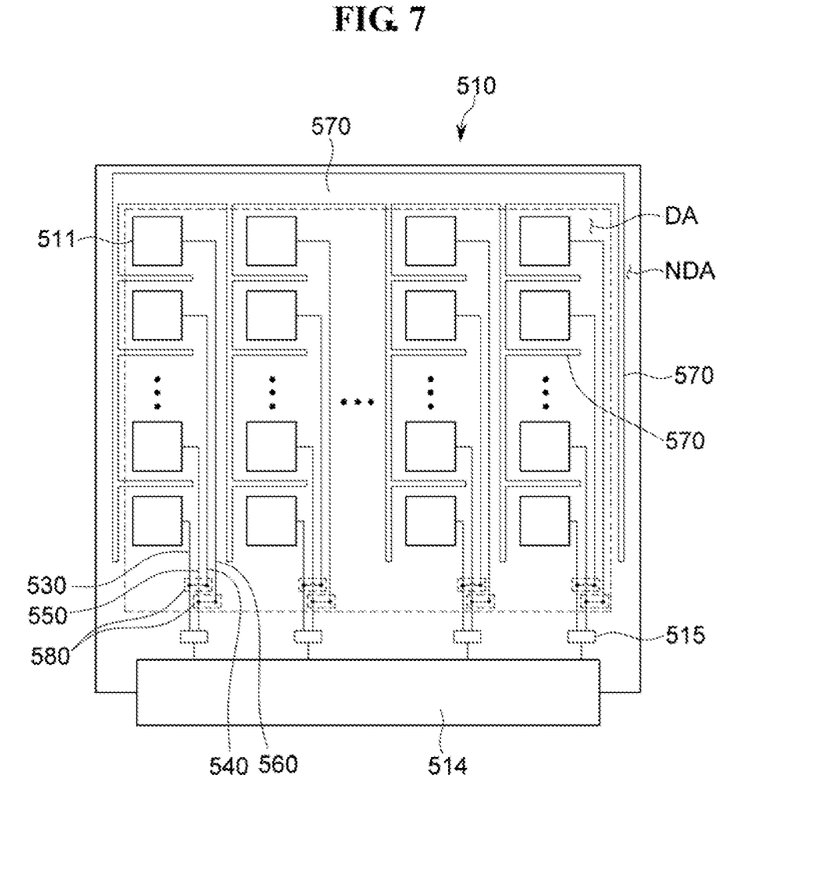
FIG. 7 schematically illustrates a touch unit according to an embodiment of the present disclosure.

FIG. 7 schematically illustrates a touch unit according to an embodiment of the present disclosure. A touch unit 510 includes a touch electrode 511, touch wirings 530, 540, 550, and 560, a common electrode 570, a touch driver 514, MUXes 515, and switch units 580. The touch unit 510 includes a display area DA and a non-display area NDA. A common voltage is the reference voltage applied to the touch electrode. The common voltage is a direct current ("DC") voltage. A part of the common electrode is located in the non-display, area NDA, and a pan of the common electrode branches from the non-display area in between the touch electrodes.

According to an embodiment, referring to FIG. 7, the touch wirings 530 and 540 are respectively connected to odd-numbered touch electrodes 511 that are arranged in one column, and the touch wirings 550 and 560 are respectively connected to even-numbered touch electrodes 511 that are arranged in one column.

According to an embodiment, the touch wirings 530 and 540 are connected to each other to be connected to one terminal of the MUX 515. In addition, the touch wirings 550 and 560 are connected to each other to be connected to another terminal of the MUX 515.

According to an embodiment, respective voltages transmitted to the touch electrodes 511 that are connected to the one terminal of the MUX 515 through different wirings are inverted. For example, respective voltages transmitted to a pair of touch electrodes 511 have the same magnitude difference but an opposite sign with respect to the common voltage.

For example, according to an embodiment, when the common voltage transmitted to the common electrode 570 is about 5 V, the voltages sequentially transmitted to the pair of touch electrodes by the MUX 515 are about 7.5 V and about 2.5 V, respectively. Accordingly, the pair of touch electrodes 511 receive voltage differences of about +2.5 V and about −2.5 V, respectively, having the same magnitude but opposite signs.

According to an embodiment, the switch unit 580 includes a switching element, such as an MOS, an OP-Amp, a diode, etc. A first switching element is connected to a first touch electrode 511, and a second switching element is connected to a second touch electrode 511. The switch unit 580 transmits a driving voltage to the touch electrodes 511 connected to each corresponding switching element, and drives only one touch electrode 511 at a specific voltage.

For example, according to an embodiment, when the common voltage is about 5 V and the voltage transmitted through the MUX 515 is about 7.5 V, only the first switching element is turned on by the voltage of 2.5 V, which is the difference between the transmitted voltage of 7.5 V and the common voltage of 5V, and the driving; voltage is transmitted only to the first touch electrode 511. In such an embodiment, the second switching element connected to the second touch electrode 511 is turned off. On the other hand, when the voltage transmitted through the MUX 515 is about 2.5 V, only the second switching element is turned on by the voltage of −2.5 V, which is the difference between the transmitted voltage of 2.5 V and the common voltage of 5V, and the driving voltage is transmitted only to the second touch electrode 511. In such an embodiment, the first switching element connected to the first touch electrode 511 is turned off. The switch unit 580 turns on a switching element only for a voltage in one direction with respect to the common voltage and transmits the driving voltage to the touch electrode 511 corresponding to the turned-on switching element.

According to another embodiment, the switch unit 580 includes one switching element connected to the first touch electrode 511 and the second tooth electrode 511. In such an embodiment, the switching element transmits the driving voltage to each of the first touch electrode 511 and the second touch electrode 511.

Figure 8:
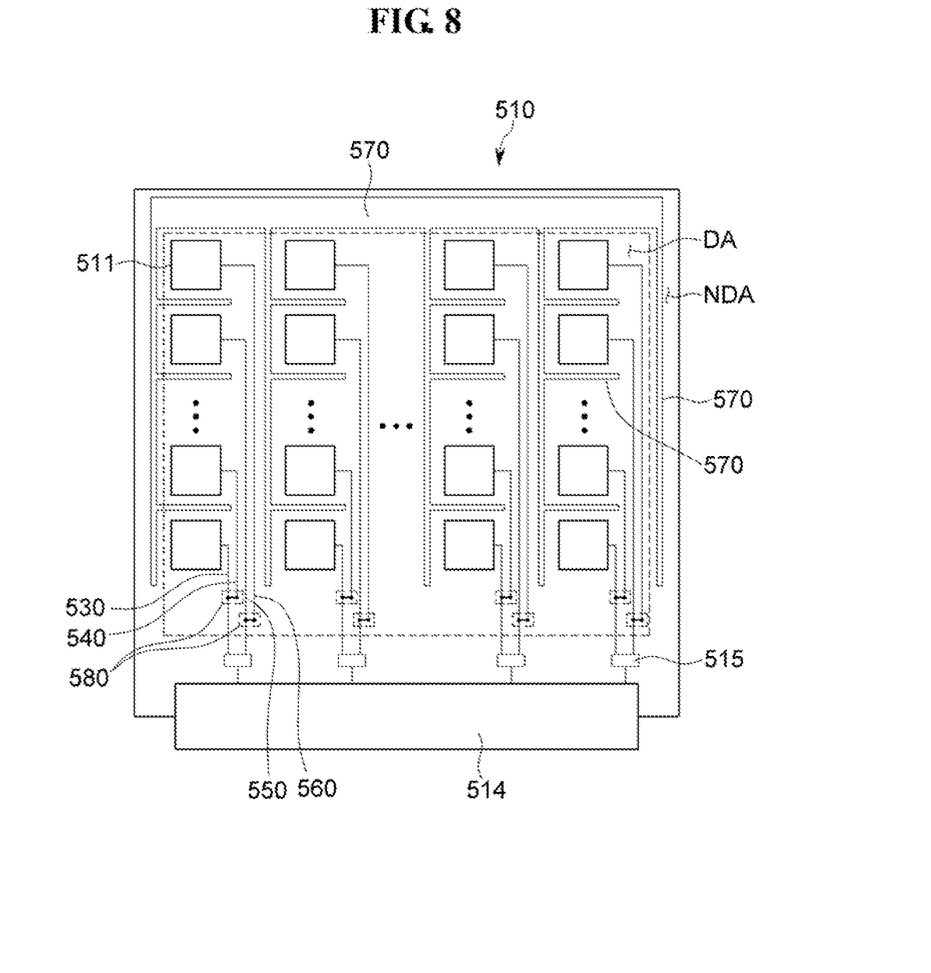
FIG. 8 schematically illustrates a touch unit according to an embodiment of the present disclosure.

FIG. 8 schematically illustrates a touch unit according to another embodiment of the present disclosure. A touch unit 510 includes a touch electrode 511, touch wirings 530, 540, 550 and 560, a common electrode 570, MUXes 515, a touch driver 514 and a switch unit 580. The touch unit 510 includes a display area DA and a non-display area NDA. The common electrode receives a common voltage which is the reference voltage transmitted to the touch electrode, and the common voltage, is a DC voltage.

According to an embodiment, the touch wirings 530 and 540 are respectively connected to touch electrodes 511 that are vertically adjacent to each other in one column. In addition, the touch wirings 550 and 560 are respectively connected to touch electrodes 511 that are vertically adjacent to each other in one column.

According to an embodiment, the touch wirings 530 and 540 are connected to each other and connected to one terminal of one of the MUXes 515. In addition, the touch wirings 550 and 560 are connected to each other and connected to another terminal of one of the MUXes 515.

According to an embodiment, respective voltages transmitted to vertically adjacent touch electrodes 511 that are connected to the one terminal of the MUX 515 through different wirings are inverted. For example, respective voltages transmitted to a pair of vertically adjacent touch electrodes 511 have the same magnitude difference but an opposite sign with respect to the common voltage.

For example, according to an embodiment, when the common, voltage transmitted to the common electrode 570 is about 5 V, the voltages sequentially transmitted by the MUX 515 to the pair of vertically adjacent touch electrodes, are about 7.5 V and about 2.5 V, respectively. Accordingly, the pair of vertically adjacent touch electrodes 511 receive voltage differences of about +2.5 V and about −2.5 V, respectively, having the same magnitude but opposite signs.

According to an embodiment, the switch unit 580 includes a switching element such as an MOS, an OP-Amp, a diode, etc. A first switching element is connected to a first touch electrode 511, and a second switching element is connected to a second touch electrode 511. The switch unit 580 transmits a driving voltage to the touch electrodes 511 connected to each corresponding switching element, and drives only one touch electrode 511 at a specific voltage.

For example, according to an embodiment, when the common voltage is about 5 V and the voltage transmitted through the MUX 515 is about 7.5 V, only the first switching element is turned on by the voltage of 2.5 V, which is the difference between the transmitted voltage of 7.5 V and the common voltage of 5V, and the driving voltage is transmitted only to the first touch electrode 511. In such an embodiment, the second switching element connected to the second touch electrode 511 is turned off. On the other hand, when the voltage transmitted through the MUX 515 is about 2.5 V, only the second switching element is turned on by voltage of −2.5 V, which is the difference between the applied voltage of 2.5 V and the common voltage of 5V, and the driving voltage is transmitted only to the second touch electrode 511. In such an embodiment, the first switching element connected to the first touch electrode 511 is turned off. The switch unit 580 turns on a switching element only for a voltage in one direction with respect to the common voltage and transmits the driving voltage to the touch electrode 511 corresponding to the turned-on switching element.

According to another embodiment, the switch unit 580 may include one switching element connected to the first touch electrode 511 and the second touch electrode 511. In such an embodiment, the switching element transmits the driving voltage to each of the first touch electrode 511 and the second touch electrode 511.

Alternatively, according to an embodiment, two touch wirings are connected to one terminal of the MUX 515 and connected to horizontally adjacent touch electrodes 511 in the same row, respectively. Respective voltages that are transmitted to the horizontally adjacent touch electrodes 511 are inverted.

Figure 9:
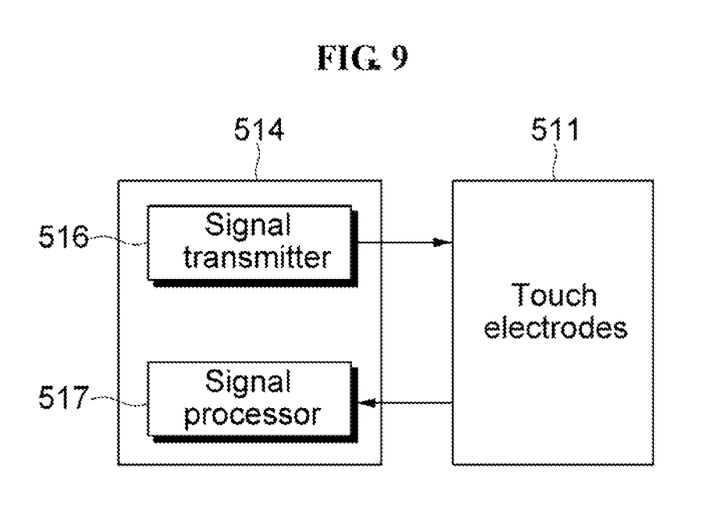
FIG. 9 is a block diagram of a touch display device according to an embodiment of the present disclosure.

FIG. 9 is a block diagram of a touch display device according to an embodiment of the present disclosure. The touch driver 514 includes a signal transmitter 516 and a signal processor 517.

According to an embodiment, the signal transmitted 516 sequentially transmits sensing signals to the touch electrode 511. The sensing signals may be current signals or voltage signals.

According to an embodiment, the signal processor 517 sequentially detects a sensing signal that is changed by a touch from the touch electrode 511. In such an embodiment, the sensing signal detected by the touch electrode 511 disposed in an area, where the touch occurs has a voltage or, current value that differs from that of the sensing si anal detected from the touch electrode 511 disposed in the area where no touch has occurred.

More specifically, according to an embodiment, when a touch occurs, a touch capacitor between the user and the touch electrode changes, and the touch capacitor is serially connected to an intrinsic capacitor of the touch electrode. As the touch capacitor is serially connected to the intrinsic capacitor, the voltage or current transmitted to the touch electrode changes.

According to an embodiment, the signal processor 517 senses variations of the sensing signal transmitted to the touch electrode and determines the touch coordinates from the location of the touch electrode 511.

Figure 10:
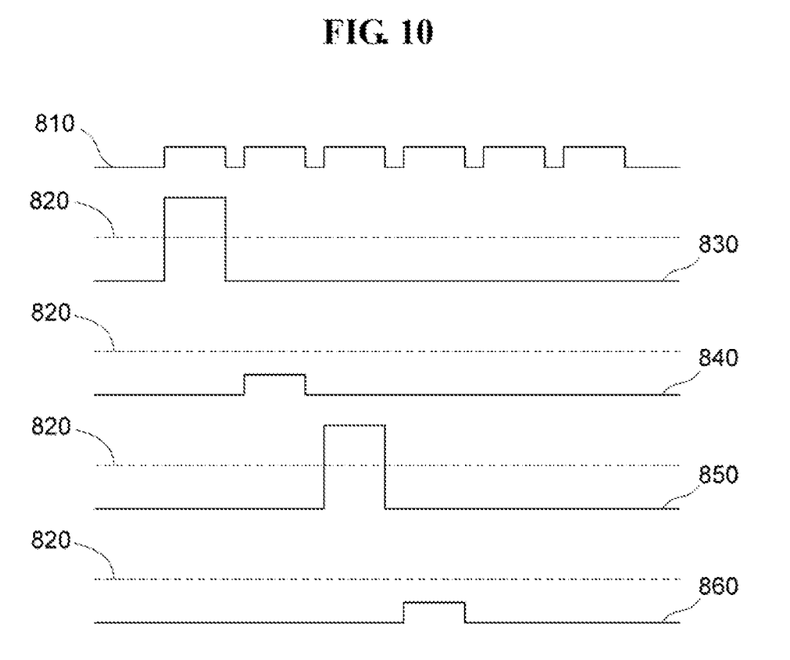
FIG. 10 illustrates waveforms of voltages transmitted to touch electrodes of a touch unit in a display device according to an embodiment of the present disclosure.

FIG. 10 illustrates waveforms of voltages transmitted to touch electrodes of a touch unit in a display device according to an embodiment of the present disclosure.

Referring to FIGS. 9 and 10, according to an embodiment, the touch driver 514 generates a clock signal 810 and driving signals 830, 840, 850, and 860 through the signal transmitted 516. A common voltage 820 is transmitted to the common electrode 570. The touch wirings connected to each other respectively receive mutually inverted voltages. That is, the touch driver 514 sequentially transmits voltages 830 and 840 having different magnitudes to the pair of touch wirings 530 and 540, respectively, through one terminal of the MUX 515 according to the clock signal 810.

Accordingly, in an embodiment, the pair of touch electrodes 511 respectively receive voltages of the same magnitude that are mutually inverted from each other with respect to the common voltage 820 that is transmitted to, the common electrode 570.

In addition, according to an embodiment, the touch driver 514 sequentially transmits voltages 850 and 860 having different magnitudes to the pair of touch wirings 550 and 560, respectively, through another terminal of the MUX 515 according to the clock signal 810. Accordingly, the pair of touch electrodes 511 respectively receive voltages of same magnitude difference but in the opposite direction with respect to the common voltage 820 that is transmitted to the common electrode 570.

As set forth hereinabove, according to one or more exemplary embodiments of the present disclosure, a display device reduces the number of touch wirings and the number of MUXes by omitting touch wirings, and by reversing the voltages respectively transmitted to the touch electrodes with respect to the common voltage transmitted to the common electrode, or by respectively transmitting to the touch electrodes voltages having the same magnitude difference in opposite directions with respect to the common voltage.

While embodiments of the present disclosure have been illustrated and described with reference to exemplary embodiments thereof, it will be apparent to those of ordinary skill in the art that various changes in form and detail may be formed thereto without departing from the spirit and scope of embodiments of the present disclosure.

What is claimed is:

1. A touch panel, comprising:
a first touch electrode and a second touch electrode disposed on a substrate;
a common electrode that receives a common voltage that is a reference for a voltage transmitted to the first and second touch electrodes;
a first touch wiring and a second touch wiring respectively connected to the first touch electrode and the second touch electrode; and
a touch driver that transmits a first voltage to the first touch electrode through the first touch wiring, and transmits a second voltage to the second touch electrode through the second touch wiring,
wherein:
the first voltage is greater than the common voltage, and
the second voltage is less than the common voltage.

2. The touch panel of claim 1, wherein the common voltage is a direct current ("DC") voltage.

3. The touch panel of claim 1, further comprising a multiplexer of which one terminal is connected to the first touch wiring and the second touch wiring and the other terminal is connected to the touch driver.

4. The touch panel of claim 3, wherein the touch driver transmits the first voltage to the first touch electrode through the multiplexer, and
transmits the second voltage to the second touch electrode through the multiplexer,
wherein the first voltage and the second voltage each have the same magnitude difference in opposite directions with respect to the common voltage.

5. The touch panel of claim 4, further comprising
a switch unit connected to the first touch electrode and the second touch electrode that transmits the first voltage to the first touch electrode and that transmits the second voltage to the second touch electrode.

6. The touch panel of claim 1, wherein the first touch electrode and the second touch electrode are vertically adjacent to each other in one column.

7. The touch panel of claim 1, wherein the first touch electrode and the second touch electrode are horizontally adjacent to each other in one row.

8. The touch panel of claim 1, wherein the first touch electrode and the second touch electrode are arranged in odd-numbered rows of one column.

9. The touch panel of claim 1, wherein the first touch electrode and the second touch electrode are arranged in even-numbered rows of one column.

10. The touch panel of claim 1, wherein the first and second voltages are sequentially transmitted to the first and second touch electrodes.

11. The touch panel of claim 1, wherein the common electrode includes a branch electrode between the first and second touch electrodes.

12. The touch panel of claim 1, wherein the first touch electrodes, the second touch electrodes, the first touch wiring and the second touch wirings are disposed on a same layer on the substrate.

13. A touch panel, comprising:
a first touch electrode and a second touch electrode disposed on a substrate;
a first touch wiring and a second touch wiring respectively connected to the first touch electrode and the second touch electrode;
a multiplexer of which one terminal is connected to the first touch wiring and the second touch wiring; and
a touch driver that transmits a first voltage to the first touch electrode through the multiplexer and the first touch wiring, and transmits a second voltage to the second touch electrode through the multiplexer and the second touch wiring,
wherein:
the first voltage is greater than a common voltage of a common electrode, and
the second voltage is less than the common voltage of the common electrode.

14. The touch panel of claim 13, wherein the common voltage of the common electrode is a reference of the first and second voltages transmitted to the first and second touch electrodes.

15. The touch panel of claim 14, wherein the common voltage is a DC voltage.

16. The touch panel of claim 14, wherein the first voltage and the second voltage each have the same magnitude difference in opposite directions with respect to the common voltage.

17. The touch panel of claim 16, further comprising
a switch unit connected to the first touch electrode and the second touch electrode that transmits the first voltage to the first touch electrode and that transmits the second voltage to the second touch electrode.

18. The touch panel of claim 13, wherein the first touch electrode and the second touch electrode are vertically adjacent to each other in one column.

19. The touch panel of claim 13, wherein the first touch electrode and the second touch electrode are horizontally adjacent to each other in one row.

20. The touch panel of claim 13, wherein the first touch electrode and the second touch electrode are arranged in odd-numbered rows of one column.

21. The touch panel of claim 13, wherein the first touch electrode and the second touch electrode are arranged in even-numbered rows of one column.

22. A touch panel, comprising:
a first touch electrode and a second touch electrode disposed on a substrate;
a first touch wiring and a second touch wiring respectively connected to the first touch electrode and the second touch electrode;
a touch driver that transmits a first voltage and a second voltage different from the first voltage to the first and second touch wirings, respectively, wherein the first voltage and the second voltage each have a same magnitude difference in opposite directions with respect to a common voltage; and
a switch unit connected to the first and the second touch electrodes,
wherein:
the switch unit transmits the first voltage to the first touch electrode, and the switch unit transmits the second voltage to the second touch electrode.

23. The touch panel of claim 22, further comprising
a multiplexer of which one terminal is connected to the first touch wiring and the second touch wiring and the other terminal is connected to the touch driver,
wherein the touch driver
transmits the first voltage to the first touch electrode through the multiplexer, and
transmits the second voltage to the second touch electrode through the multiplexer.

24. The touch panel of claim 22, further comprising
a common electrode that receives the common voltage that is a reference of the first and second voltages respectively transmitted to the first and second touch electrodes, wherein the common voltage is a DC voltage.

\* \* \* \* \*